United States Patent [19]
Tash et al.

[11] Patent Number: 5,636,248
[45] Date of Patent: Jun. 3, 1997

[54] METHOD AND SYSTEM FOR REGENERATING AMPLITUDE AND TIMING CHARACTERISTICS OF AN ANALOG SIGNAL

[75] Inventors: Harvey Tash; Robert C. Reed, both of San Diego, Calif.

[73] Assignee: The United States of America as represented by the Secretary of the Navy, Washington, D.C.

[21] Appl. No.: 319,146

[22] Filed: Oct. 4, 1994

[51] Int. Cl.⁶ .................................................. H04L 27/10
[52] U.S. Cl. ........................................ 375/282; 375/333
[58] Field of Search ................................. 375/242, 254, 375/282, 284, 285, 333, 346, 361, 359, 354

[56] References Cited

U.S. PATENT DOCUMENTS

| | | |
|---|---|---|
| 4,185,273 | 1/1980 | Gowan . |
| 4,292,626 | 9/1981 | Smithlin . |
| 4,603,322 | 7/1986 | Blair . |
| 4,746,898 | 5/1988 | Loeppert . |
| 4,868,569 | 9/1989 | Montgomery . |
| 4,905,257 | 2/1990 | Palkert et al. . |
| 4,992,790 | 2/1991 | Montgomery . |
| 5,023,891 | 6/1991 | Johnson, III . |
| 5,127,023 | 6/1992 | Tash et al. . |
| 5,163,067 | 11/1992 | Wight et al. . |
| 5,220,582 | 6/1993 | Kaharu et al. . |
| 5,272,722 | 12/1993 | Tran . |

*Primary Examiner*—Stephen Chin
*Assistant Examiner*—Hai H. Phan
*Attorney, Agent, or Firm*—Harvey Fendelman; Peter A. Lipovsky; Michael A. Kagan

[57] ABSTRACT

The present invention provides a system and method for using a single digitized component of an analog signal to be converted into a pair of digital signals used to re-establish the analog signal. A low level serial transceiver transforms a first analog signal into a first digital signal representing the complement of the first analog signal. The first digital signal is propagated through an electronic interface circuit such as a matrix switch or through some electronic circuit used to detect characteristics of the analog signal. In response to receiving the first digital signal, a logic circuit generates a second digital signal representing the analog signal, and also outputs the first digital signal. In response to receiving the first and second digital signals, a retimer generates a third digital signal comprising a series of pulses. Each of the pulses of the third digital signal is generated in response to the retimer determining that the first digital signal undergoes a positive voltage transition from one logic level to a higher logic level. The retimer also generates a fourth digital signal comprising a series of pulses. Similarly, each pulse of the fourth digital signal is generated in response to the retimer determining that the second digital signal undergoes a positive voltage transition from one logic level to a higher logic level. A second low level serial transceiver transforms the third and fourth digital signals into a second analog signal having substantially the same waveform as has the first analog signal.

11 Claims, 9 Drawing Sheets

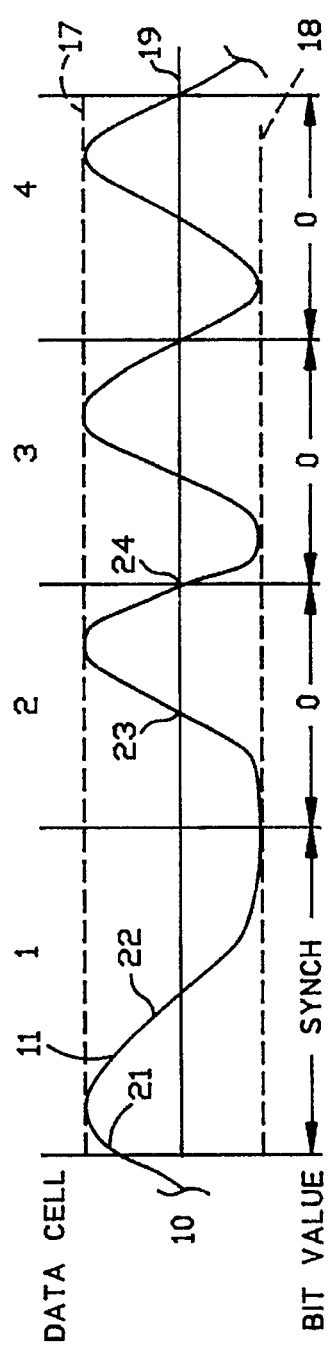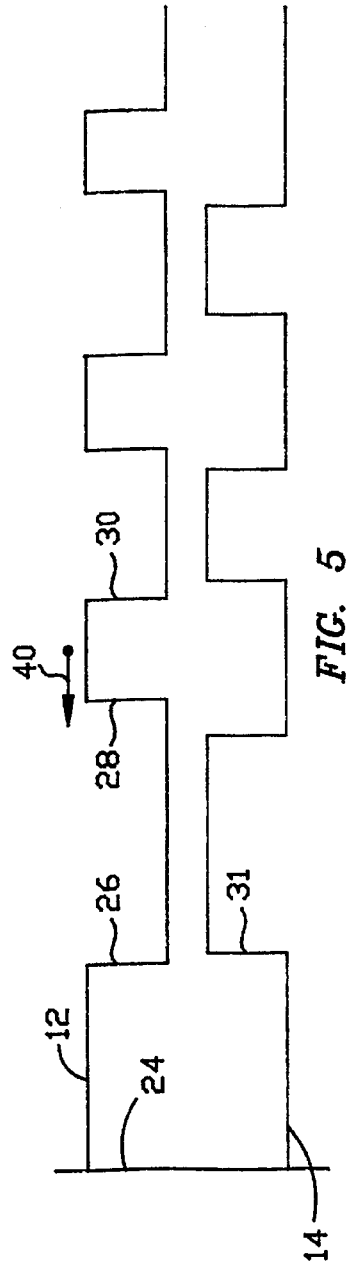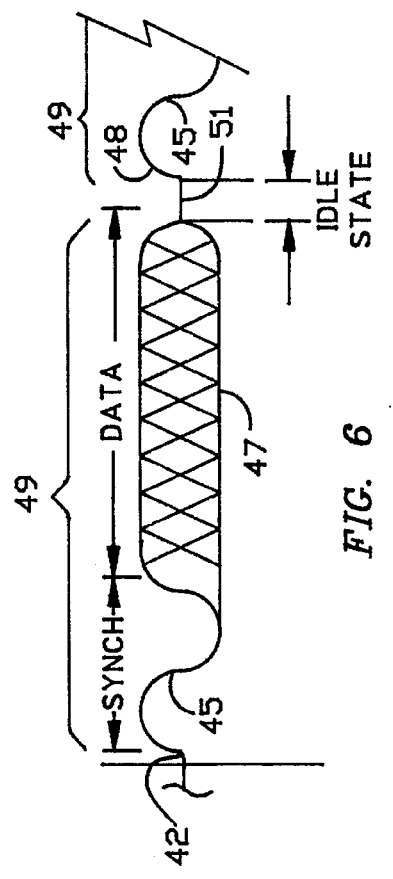

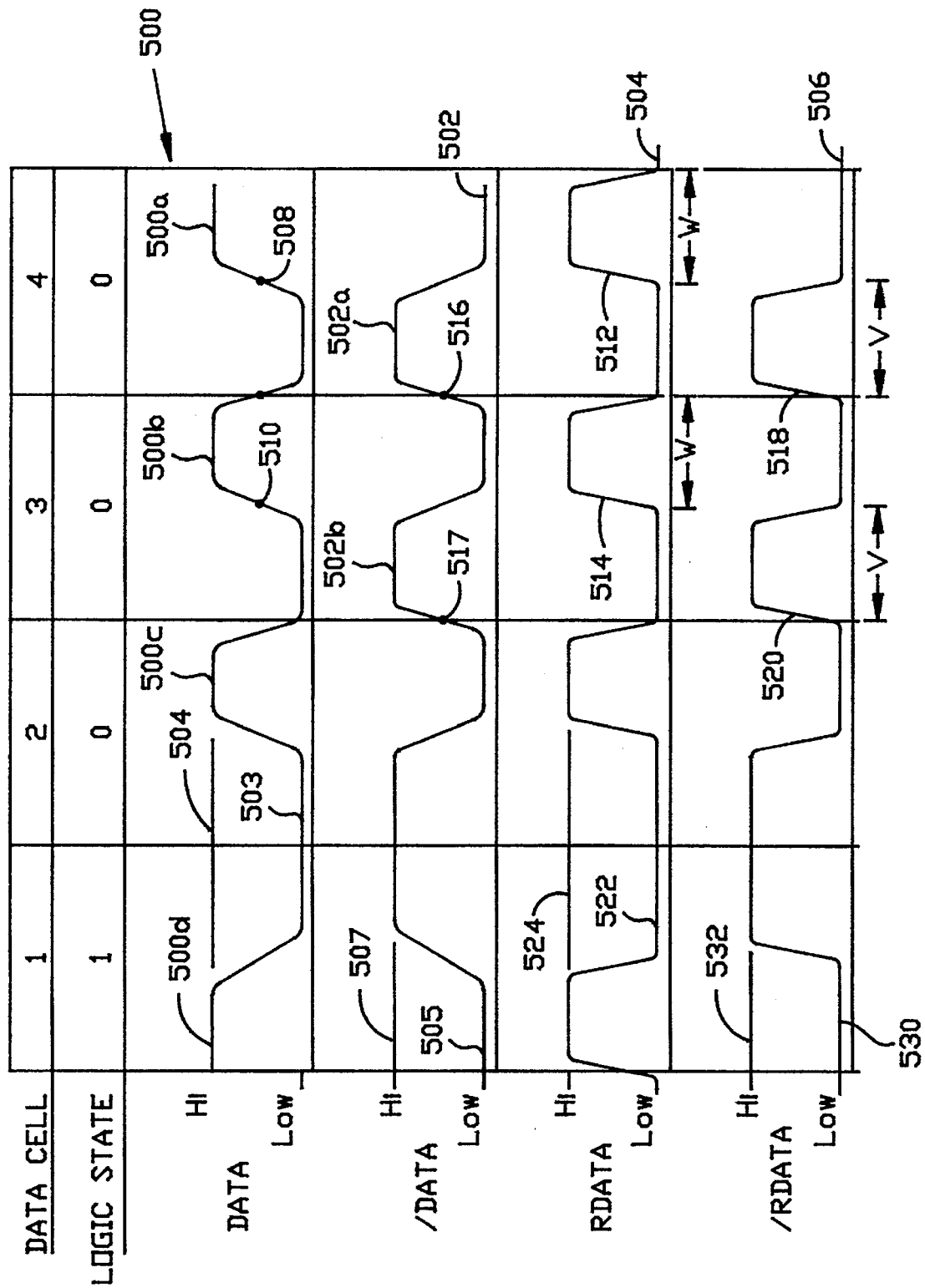

METHOD AND SYSTEM FOR REGENERATING AMPLITUDE AND TIMING CHARACTERISTICS OF AN ANALOG SIGNAL

STATEMENT OF GOVERNMENT INTEREST

The invention described herein may be manufactured and used by or for the government of the United States of America for governmental purposes without the payment of any royalties thereupon or therefore.

BACKGROUND OF THE INVENTION

The present invention relates to the field of signal processing, and more particularly, to regenerating amplitude and timing of an analog signal and to reducing propagation delay of the signal.

Manchester encoding is a well-known technique in which data and data clock components are combined into a single encoded waveform. The encoded waveform is divided into time slots of equal duration commonly called data cells during each of which one binary digit (bit) of information is conveyed. The state of the bit is indicated by a transition in the waveform occurring at the center or mid-cell point of the data cell. The direction of the transition indicates the value of the bit. At least one signal transition per data cell occurs, providing a component in the frequency domain centered at twice the bit occurrence rate.

The digital nature of the Manchester code provides the usual preservation of data information in the face of communication channel corruption by noise and other transmission effects. The timing component of the waveform eliminates the need for two physically separate transmission channels, as for example, one for data and one for timing.

Transmission standard, MIL-STD-1397B, Type E (NAVY), provides for two-way information transfer in a single bi-directional transmission channel. The transmission scheme has three states: logic 1, logic 0, and an idle state. The protocol of this standard imposes a frame format in which up to a given number of bits are transmitted as an integral unit from an information source on the transmission line. A "synch" bit begins each frame. A frame may have three or more bits in addition to the synch bit. Each frame size is variable, and the end of a frame is indicated by the presence of the idle state.

An essential element of a communication system employing the data transmission and protocol approaches just described is an element which is able to convert a Manchester-encoded waveform (normally a three-state signal) to a two level digital waveform and which can convert a two level digital waveform into a Manchester waveform. Such an element is commonly referred to as a "codec", which is a shortened form of the term coder/decoder. As is conventional, codecs are important components of data links between computers and peripherals. Frequently, such data links convey information over relatively great distances, thereby often employing a Manchester-encoded transmission channel. In such an application, a codec decodes data into a local format from the Manchester-encoded format and encodes locally-formatted data into the Manchester format. Usually, the decoder portion of the codec includes a retiming provision through which the received Manchester signal is improved by reestablishing the relative timing of the two level digital waveform transitions.

U.S. Pat. No. 5,127,023 describes a retiming decoder/encoder ("RDE") by which MIL-STD 1397 Type "E" (Low Level Serial) data transmitted is retimed and converted into a more convenient format for the purposes of switching, etc., then reconverted back to low level serial for transmission to the end user computer or peripheral device. The RDE converts low level serial signals in to a pair of complementary Manchester encoded digital signals by an input transceiver. These signals are next retimed and decoded into a simpler NRZ format by the RDE and conveyed through a switching matrix to the output section. At the output, the reverse process takes place. First, the NRZ signal is encoded back to a Manchester encoded complementary pair by the RDE encoder and sent to the output transceiver, where they are converted back into a low level serial analog signal.

While highly successful in function, the RDE described in U.S. Pat. No. 5,127,023 requires a system clock in order to synchronize the transfer of data from the input to output stages of the circuit. The circuitry to support such synchronization results in a propagation delay and a subsequent reduction in data throughput. Additionally, the system clock increases hardware complexity and EMI interference.

A paramount consideration in the distribution of low level serial data or its conveyance between two communication nodes, such as a computer and a peripheral device, is that any intermediate device be as transparent as possible to minimize propagation delay. Propagation delay of the data can interfere with the system software so as to make the transmission unworkable. As computers become faster, the data transfer rate assumes critical importance. Delay in the transmission of such data causes a reduction in the data throughput. The delay may also severely limit the communication distance between communication nodes because any delay adds to that already contributed to by cable length between equipment.

One method of reducing delay in the propagation of a data signal is to decrease the physical distance and resulting cable length between communication nodes or devices. However, there are many applications where this traditional solution is not practical. Therefore, there is a need for a system and method for minimizing the propagation delay of Manchester encoded data through an intermediate electronic device, such as a switch, in a way which maintains the integrity of the waveform (amplitude and timing) of the original encoded data.

SUMMARY OF THE INVENTION

The present invention provides a system and method for regenerating amplitude and timing characteristics of a signal which may have incurred distortion as a result of having been propagated through an electrical circuit.

One aspect of the invention provides a system which includes a low level serial transceiver for transforming a first analog signal into a first digital signal representing the complement of the first analog signal. The first digital signal is propagated through an electronic interface circuit such as a matrix switch or through some electronic circuit, which may for example, be used to detect certain characteristics of the analog signal. In response to receiving the first digital signal, a logic circuit generates a second digital signal representing the analog signal, and also outputs the first digital signal. In response to receiving the first and second digital signals, a retimer generates a third digital signal comprising a series of pulses. Each of the pulses of the third digital signal is generated in response to the retimer determining that the first digital signal undergoes a positive voltage transition from one logic level to a higher logic level. The retimer also generates a fourth digital signal comprising a series of pulses. Similarly, each pulse of the fourth digital signal is generated in response to the retimer determining that the second digital signal undergoes a positive voltage transition from one logic level to a higher logic level. A second low level serial transceiver transforms the third and fourth digital signals into a second analog signal having substantially the same waveform as has the first analog signal.

The present invention may also be characterized as a method for regenerating amplitude and timing characteristics of an analog signal. Such method includes the steps of: 1) transforming a first analog signal having a first waveform into a first digital signal representing the complement of the analog signal; 2) propagating the first digital signal through an electronic interface circuit; 3) generating a second digital signal representing the analog signal in response to receiving the first digital signal, and outputting the first digital signal; 4) transforming the first and second digital signals into a first retimed digital signal and a second retimed digital signal, where the first and second retimed digital signals correspond to the first and second digital signals, respectively; and 5) transforming the first and second retimed digital signals into a second analog signal having a second waveform substantially corresponding to the first waveform.

An important feature of the present invention is that it provides a system and method which overcomes any timing distortion to which the analog or its digital representation may become subjected. A significant advantage of this characteristic is that data nodes between which data is transferred may be located further apart without risk of introducing timing distortion in the data. Another advantage of the present invention is that any data propagated by way of the present invention is not as vulnerable to corruption, thus reducing or eliminating data errors or even loss. The achievement of these features and advantages will be appreciated when the following detailed description is read in conjunction with the below-described drawings.

Another advantage of the present invention is that data propagated through the invention need not be subjected to propagational delays caused by clocking of the data or by decoding/encoding conversions.

BRIEF DESCRIPTION OF THE DRAWINGS

FIG. 4 illustrates a Manchester-encoded waveform.

FIG. 5 shows a digital representation of the Manchester encoded waveform of FIG. 4, and its complement.

FIG. 6 is a data frame of a Manchester encoded waveform.

FIG. 12 presents of set of waveforms showing the overall operation of the retimer.

Throughout the several figures, like components are referenced with like designations.

DETAILED DESCRIPTION OF THE PREFERRED EMBODIMENTS

The present invention provides a system and method for using a single digitized component of an analog signal to be conveyed through an intermediate device and subsequently converted into a pair of bi-level digital signals which are used to re-establish the original analog signal.

Figure 1:
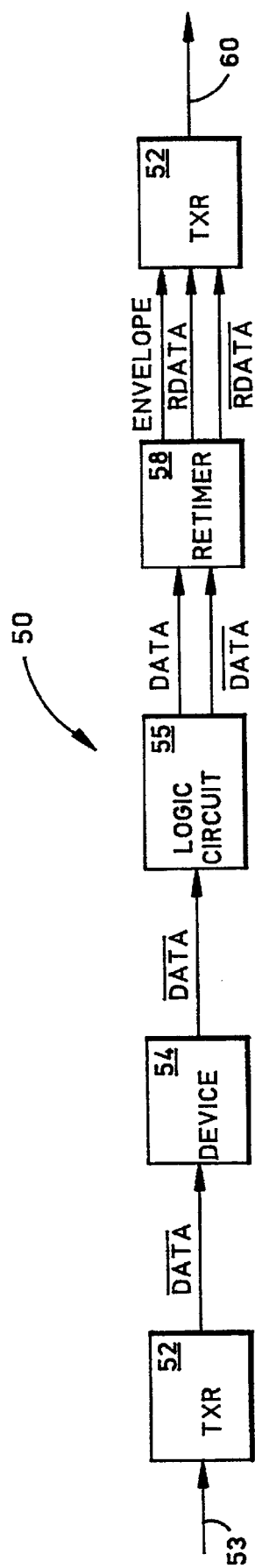
FIG. 1 is a block diagram of a system for achieving low level serial interface enhancement embodying various features of the present invention.

An overview of a system 50 embodying various features of the present invention is described with reference to FIG. 1. An analog data signal 53, such as a Manchester encoded data signal, is provided to a transceiver 52 which transforms the analog data signal into a digital data signal, "/DATA", representing the complement of the analog data signal 53. Transceivers generating digital representations of analog data signals and their complements are well known in the art. For example, in the preferred embodiment of the present invention, the transceiver may be implemented in accordance with the teachings of U.S. Pat. No. 5,272,722, "Low Level Serial Transceiver," assigned to the United States of America and incorporated herein by reference. The digital data signal /DATA next is propagated through an intermediate device 54 which, for example, may be an M×N matrix switch, a repeater, or an interface monitor. After propagating through the throughput device 54, the data signal /DATA is provided to a logic circuit 55 which generates a digital data signal, "DATA", which represents the analog data signal 53, in response to receiving the data signal /DATA. The logic circuit 55 then provides the data signals DATA and /DATA to a retimer 58 which transforms the data signals DATA and /DATA into retimed digital data signals RDATA and /RDATA, respectively. By way of example, the logic circuit 55 may be implemented as an Intel Part No. SN74265. The retimer 58 eliminates pulse width errors which accumulate in the data signals DATA and /DATA as a result of all the transformations incurred by the analog data signal 53 and data signal /DATA. A second transceiver 52 receives data signals RDATA and /RDATA and transforms them into an analog data signal 60 having a waveform which duplicates the waveform of the analog data signal 53.

Figure 2:
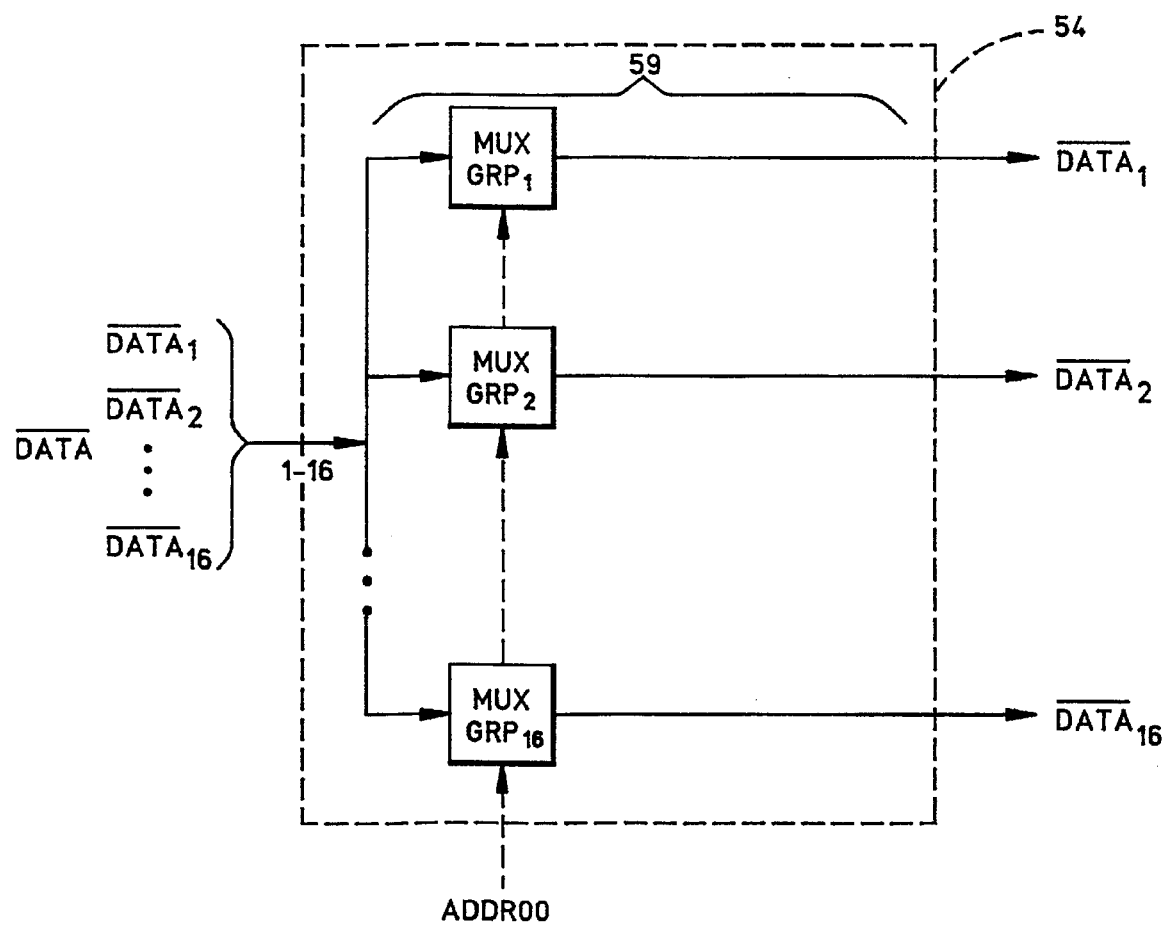
FIG. 2 is a block diagram of a matrix switch which may be used as an intermediate electronic device in the system of FIG. 1.
Figure 3:
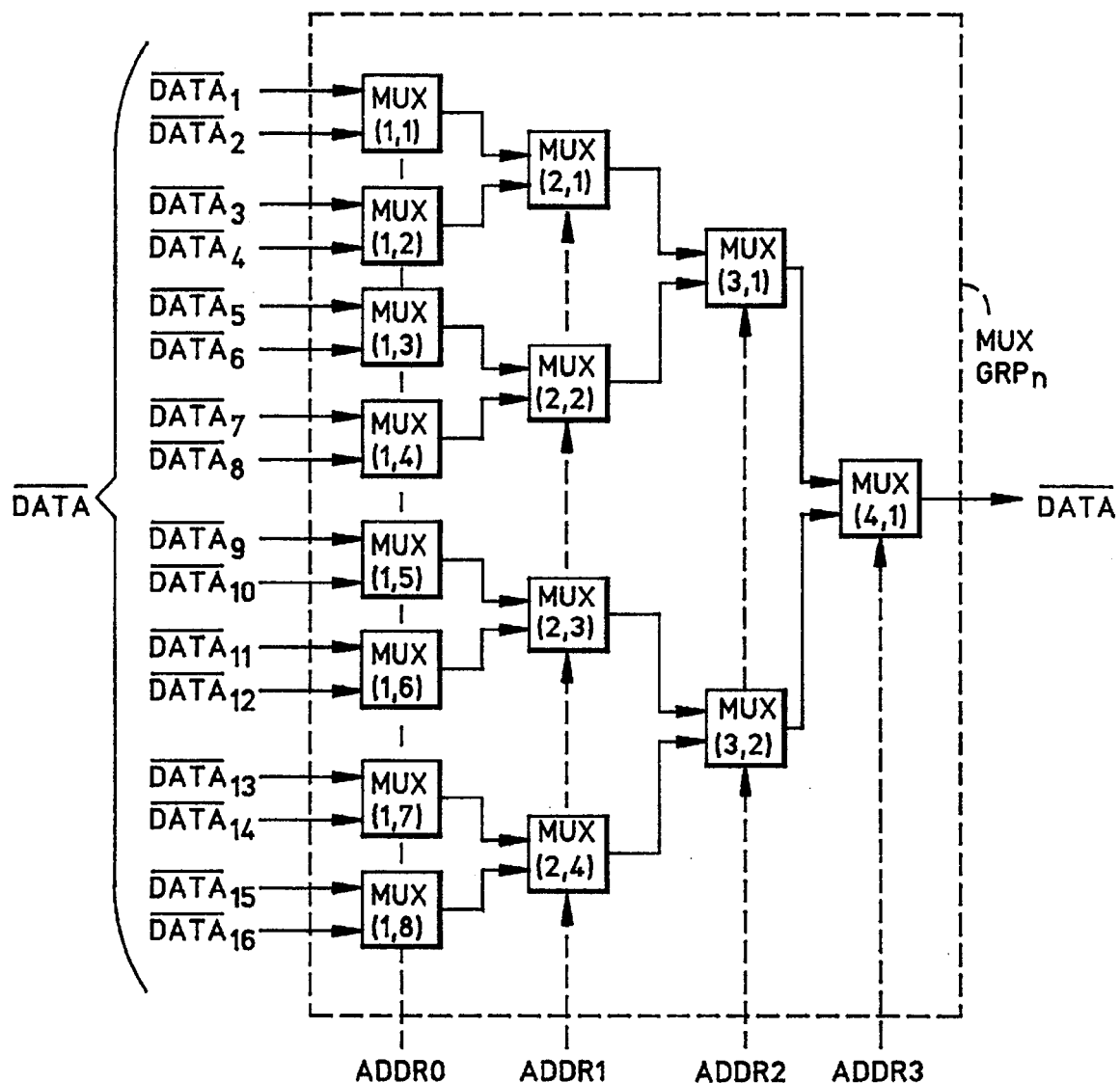
FIG. 3 is a block diagram of a multiplexer group of FIG. 2.

As previously mentioned, the intermediate device 54 may be an M×N matrix switch 59. Generally matrix switches are well known by those skilled in the art. However, an example of one matrix switch particularly suited in one implementation of the present invention is described with reference to FIGS. 2 and 3. Referring now to FIG. 2, there is shown, by way of example, a 16×16 matrix switch 59 comprised of 16 multiplex groups designated as MUX GRP$_n$, where n is a positive integer from 1 to 16, which each receive the DATA signal from the transceiver 52. The purpose of the matrix switch 59 is to direct any of the (16) input /DATA signals to any one of (16) outputs of the matrix switch. Each multiplex group provides for a single output for any of the (16) inputs it receives. The process of routing a signal through the matrix switch 59 begins by selecting a single multiplexer group for operation, as would be well known by those skilled in art. Each MUX GRP$_n$ may be configured as shown in FIG. 3 to include an array of multiplexers MUX$_{(p,q)}$, where p and q represent positive integers. The purpose of the multiplexers is to output a predetermined one of the inputs to the multiplexer. A first row of multiplexers $MUX_{(1,1)}$ to $MUX_{(1,16)}$ each receive two inputs of the input signals /DATA$_1$ to /DATA$_{16}$, respectively, which comprise the composite signal /DATA. By way of example, the multiplexers $MUX_{(p,q)}$ may be implemented as an Intel LLS Digital To Digital Electronic Switch, Part No. SA-2588A/FSQ-157(V). In order to select the particular address line on which to output any particular one of the input signals /DATA$_n$, where "n" is defined above, a MUX GRP address signal ADDR0 selects one input of multiplexers $MUX_{(1,1)}$ to $MUX_{(1,8)}$; a second address signal ADDR1 selects one input of multiplexers $MUX_{(2,1)}$ to $MUX_{(2,4)}$; a third address signal ADDR2 selects one input of multiplexers $MUX_{(3,1)}$ to $MUX_{(3,2)}$; a fourth address signal ADDR3 selects one input of multiplexer $MUX_{(4,1)}$. The address signals ADDRX may be generated by a computer, not shown, as would be well known by those of ordinary skill in the art. Thus, it may be appreciated that the 16×16 matrix switch 59 may be used to switch any one of an "M" number of inputs lines to any one of "N" output lines, where "M" and "N" are each integral multiples of two. It is to be understood that "N" and "M" are not limited to each being equal to 16, but rather may be any integral multiples of two, as for example, 4, 8, 16, 32, 64, etc., required to suit the needs of a particular application.

In order to appreciate the present invention, a discussion of Manchester encoded data is first presented. FIG. 4 illustrates a Manchester-encoded waveform 10, shown, by way of example to include a frame comprising four data cells 1, 2, 3, and 4 which each contain an information bit. In general, the Manchester-encoded waveform 10 transitions between signaling states 17 and 18 around a quiescent state 19. When no information is transmitted, the waveform 10 enters and assumes the quiescent state 19. Each of the data cells 1–4 represent an encoded portion of the waveform 10. The first cell 1 includes a synch bit which at a time representing the mid-cell, transitions from the relatively "high" level 17 to the relatively "low" level 18 through the quiescent level 19. (Hereafter, this transition will be referred to as a "negative-going" transition). In data cells 2, 3, and 4, the Manchester waveform, by way of example, transitions at mid-cell from level 18 to level 17 (hereinafter, "positive-going" transitions). In the data transmission format for the waveform 10, negative mid-cell transitions denote a digital "one", and positive mid-cell transitions denote a digital "zero". FIG. 5 illustrates a pair of complementary bilevel digital data waveforms 12 and 14, which together represent the analog waveform 10.

In the communication protocol of MIL-STD-1397B, Type E, the first bit in data cell 1 of every frame of transmitted Manchester-encoded data has the pattern illustrated in FIG. 4, which corresponds to an encoded "1". The first bit in data cell 1 is referred to as synch bit 11. The synch bit synchronizes the incoming waveform 10 to the operations of the terminal where it is received. For this, two transitions, indicated by 21 and 22 are provided.

In the system 50, processing the Manchester waveform through the transceiver 52 imposes two significant artifacts on the waveforms 12 and 14. First, transmission through the circuitry of the system 50 characteristically widens the first half of the synch bit with respect to the corresponding widths of subsequent bits. Thus, in the waveform 10, the period between 21–22 of cell 1 is greater than the period 23–24 of the subsequent bit in cell 2. Second, in converting the waveform 10 to the complementary waveforms 12 and 14, a transceiver reduces the pulse widths of the digital waveforms 12 and 14 corresponding to the pulse widths of the analog waveform 10 following the synch bit. Thus, the width 28–30 is less than the width 23–24. These pulse width altering effects are referred to as "pulse width distortion".

FIGS. 4, 5 and 6 illustrate the framing feature of a communication protocol according to the MIL-STD-1397B. Referring to FIG. 6, the Manchester-encoded waveform 42 comprises a data frame 49 of Manchester-encoded data including a synch bit 45 and a data component 47. The frame 49 is separated from a following frame by an idle period 51. Since MIL-STD-1397B, Type "E" requires intra-frame transitions to be separated by no more than 100 ns, an absence of transitions for a period greater than 100 ns means that a frame has ended. Therefore, an interframe idle period 51 between the end of one frame and the beginning of the a subsequent frame corresponds to the time between the last signal transition in the preceding frame and the positive-going transition in the synch pulse of one succeeding frame. Thus, in FIG. 6, the end of the interframe idle period 51 is signified by the positive transition 48 beginning the synch bit of the following frame. Ideally, the frame signal 49 goes positive with the positive transition in the synch bit 45 of the Manchester waveform 10 and falls at the end of the frame.

The retimer 58 retimes the pair of complementary bilevel data signals DATA and /DATA received from the logic circuit 55 and removes the timing distortion described above. Referring now to FIG. 12, there are shown examples of a DATA signal 500 and a /DATA signal 502 which are provided as inputs to the retimer 58. In response to receiving DATA signal 500 and RDATA signal 502, the retimer generates, by way of example, an RDATA signal 504 and a /RDATA signal 506. The DATA signal 500 is comprised, by way of example, of a series of digital data signals, or pulses 500a, 500b, 500c, and 500d which transition between a low logic level 503 to a high logic level 504. It is to be understood that a "low" logic level refers to a low voltage level and a "high" logic level refers to a voltage level higher than the low voltage level. The /DATA signal 502 is comprised, by way of example, of a series of digital data pulses 502a and 502b shown to transition between a low logic level 505 to a high logic level 507. The retimer 58 detects and responds to positive voltage transitions in the DATA and /DATA signals 500 and 502. Positive transitions satisfy the relation dv/dt>0, where "v" represents the instantaneous voltage of the signals DATA 500 and /DATA 502, and "t" represents time.

Still referring to FIG. 12 with regard to the DATA signal 500, for example, in response to detecting the positive transition 508 of the pulse 500a occurring at the mid-point of data cell 4, and the positive transition 510 of the pulse 500b occurring at the midpoint of data cell 3, the retimer 58 generates a series of pulses 512 and 514 comprising the RDATA signal 504 which transition between a low logic level 522 and a high logic 524. An important feature of the retimer 58 is that the pulses 512 and 514 have a predetermined pulse width, "W". Thus, it may be appreciated that no matter how distorted the pulses 500a, 500b, and 500c of the DATA signal 500 may become, the RDATA signal 504 generated by the retimer 58 accurately duplicates the timing characteristics of the DATA signal 500 without any distortion. With reference to the DATA signal 500 and the RDATA signal 504, by way of example, a transition to a high logic state represents a logic "0" and to a low logic level represents a logic "1".

Still referring to FIG. 12 with regard to the /DATA signal 502, for example, in response to detecting the positive voltage transition 516 of the pulse 502a occurring at the beginning of data cell 4, and the positive voltage transition 517 of the pulse 502b occurring at the beginning of data cell 3, the retimer 58 generates a series of pulses 518 and 520, respectively, comprising the /RDATA signal 506 which transition between a low logic level 530 and a high logic level 532. The pulses 518 and 520 have a predetermined pulse width, "V" which is generally, but not necessarily equal to "W". Thus, no matter how distorted the pulses 502a and 502b of the /DATA signal 502 may become, the /RDATA signal 506 generated by the retimer 58 accurately duplicates the timing characteristics of the /DATA signal 502 without any distortion. With reference to the /DATA signal 502 and the /RDATA signal 506, by way of example, a transition to a high logic level, or state represents a logic "1" and to a low logic level represents a logic "0".

The retimer generates the retimed signals RDATA and its complement /RDATA, as well as a binary ENVELOPE signal, which are provided to the second transceiver 52. The ENVELOPE signal controls the output state of the transceiver 52, i.e., whether the transceiver is in a transmit or receive mode.

Figure 7:
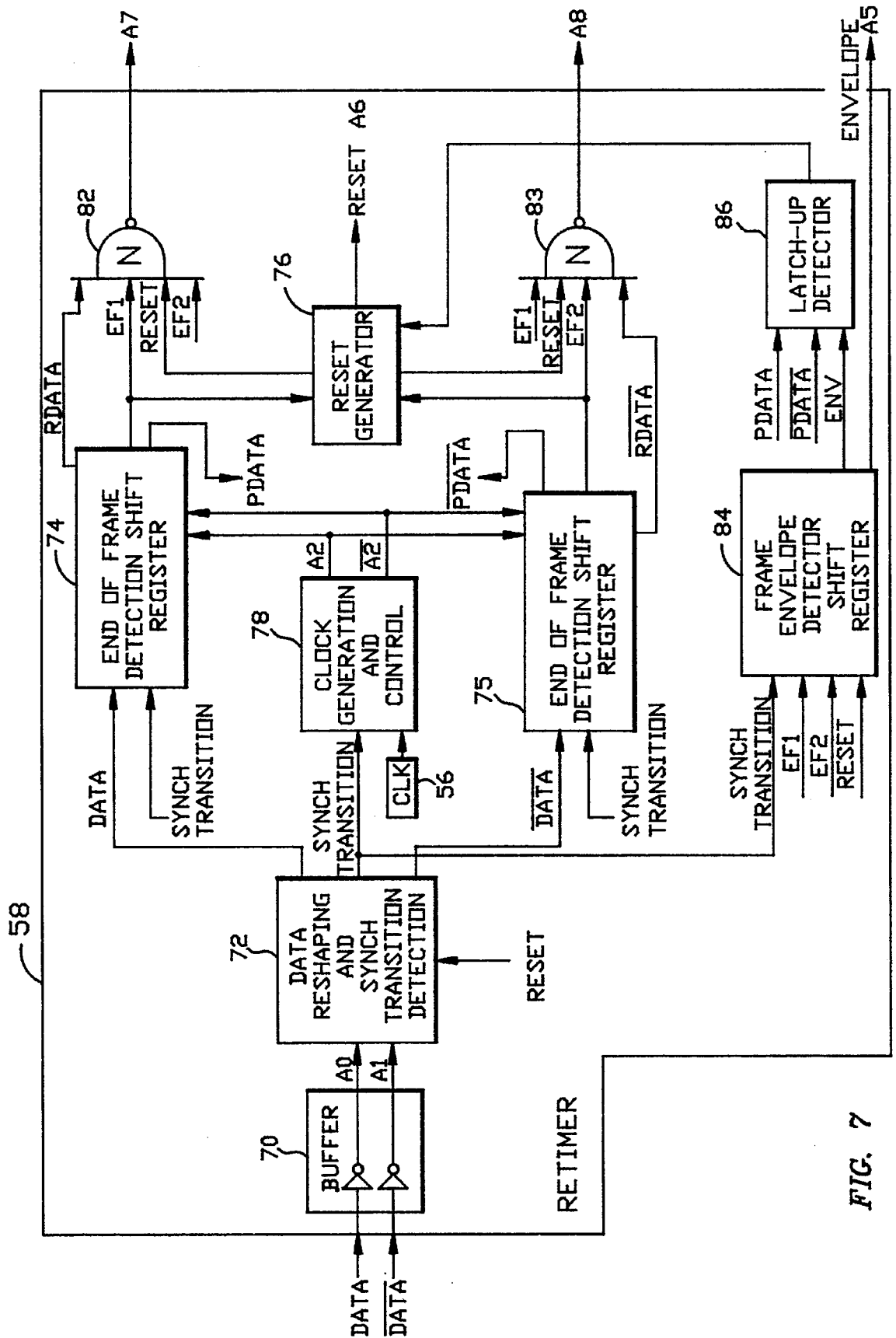
FIG. 7 is a more detailed block diagram of the retimer illustrated in FIG. 1.

Referring now to FIG. 7, the buffer 70 of retimer 58 receives the complementary binary data signals DATA and /DATA from the logic circuit 55 which are denoted A0 and A1, respectively, for convenience. These signals are fed to a data reshaping and synch transition detection circuit 72 which corrects the timing distortion of the A0 and A1 signals. In the discussion following, it is to be understood that the signals A0 and A1 have the corresponding waveforms 12 and 14, respectively, of FIG. 5.

After retiming, the A0 and A1 signals are provided as the DATA and /DATA signals to shift registers 74 and 75, respectively, for end of frame detection. Circuit 72 also looks for the synch bit 45 in the data frame 49 (FIG. 6). In response to detecting the synch bit 45, the circuit 72 produces a SYNCH TRANSITION signal which initiates the overall operations of the retimer 58. The SYNCH TRANSITION signal is fed to the registers 74 and 75 to enable the registers to serially receive and shift the DATA and /DATA signals, respectively. Each shift register 74 and 75 includes, by way of example, six serially-connected flipflops (FIG. 8) for serially shifting the DATA and /DATA signals, respectively, through the registers.

The SYNCH TRANSITION signal is also provided to a clock generation and control circuit 78 which receives the output of the clock 56 and, in response to the SYNCH TRANSITION signal, produces a pair of complementary clocks A2 and /A2. The clock signals A2 and /A2 are used to double clock registers 74 and 75. The registers 74 and 75 serially shift the DATA and /DATA signals within a window of time wide enough to detect the end of a data frame.

In one preferred embodiment of the present invention, the Manchester-encoded analog signal 53 has a data rate of 10 MHz and a clock rate of 10 MHz. Thus, data bit transitions will occur at 100 ns intervals at the midpoint of each data cell. The period of each data cell is also 100 ns wide. Therefore, in order to clock the DATA and /DATA signals through the registers 74 and 75, respectively, optimum clocking requires that the sampling clock edge fall at the one-quarter and three-quarter points in the Manchester data cells in order to avoid the transition that always occurs at the midpoint. In the preferred embodiment, by way of example, such clocking may be implemented by a 20 MHz clock. Optimum clocking is accomplished by the clock generation and control circuit 78 which is arranged to delay the output of the first clock pulse by a nominal period of 25 ns after being released by the SYNCH TRANSITION, which corresponds to the second transition of a data frame. The clock generated by the circuit 78 is derived from an input signal generated by the clock circuit 56. Preferably, the clock circuit 56 generates a free-running 40 MHz clock which is asynchronous with the data received from the logic circuit 55. However, the speed of clock 56 means that the clocks A2 and /A2 which are derived from it will nominally vary by no more than ±12.5 ns about the one-quarter and three-quarter points of a pulse width in the data cell, and will fall within the first and last halves of the data cell period.

Since data bit transitions occur at 100 ns intervals about the midpoint of a Manchester data cell, the test for the end of a data frame must be greater than 100 ns in order to detect a cessation of transitions. In the preferred embodiment of the circuit 50, the end of a data frame is detected when a period of 150 ns (the idle period 51) transpires during which no transitions in the pair of complementary binary data signals A0 and A1 occur. Therefore, the shift registers 74 and 75 provide 150 ns windows of time through which the DATA and /DATA signals are serially shifted, respectively.

As the transitions in the data signals stop, either the DATA or /DATA signal will remain high due to the last transition. This high level will eventually fill one of the shift registers 74 or 75. Reset generator circuit 76 continuously monitors the contents of the shift registers 74 and 75. When the first of either register 74 or 75 is entirely filled with high-level signals, circuit 76 will activate a RESET signal, indicating the end of the data frame. A low RESET signal causes the operation of the clock generation and control circuit 78 to stop, placing it in a quiescent state, with clock signals A2 high and /A2 low. The low reset signal also causes the outputs of the shift registers 74 and 75 go low, causing the RESET signal generated by the reset generator circuit 76 to go back to the high state, whereupon the retimer 58 is reset to accept a new data frame 42.

Figure 8:
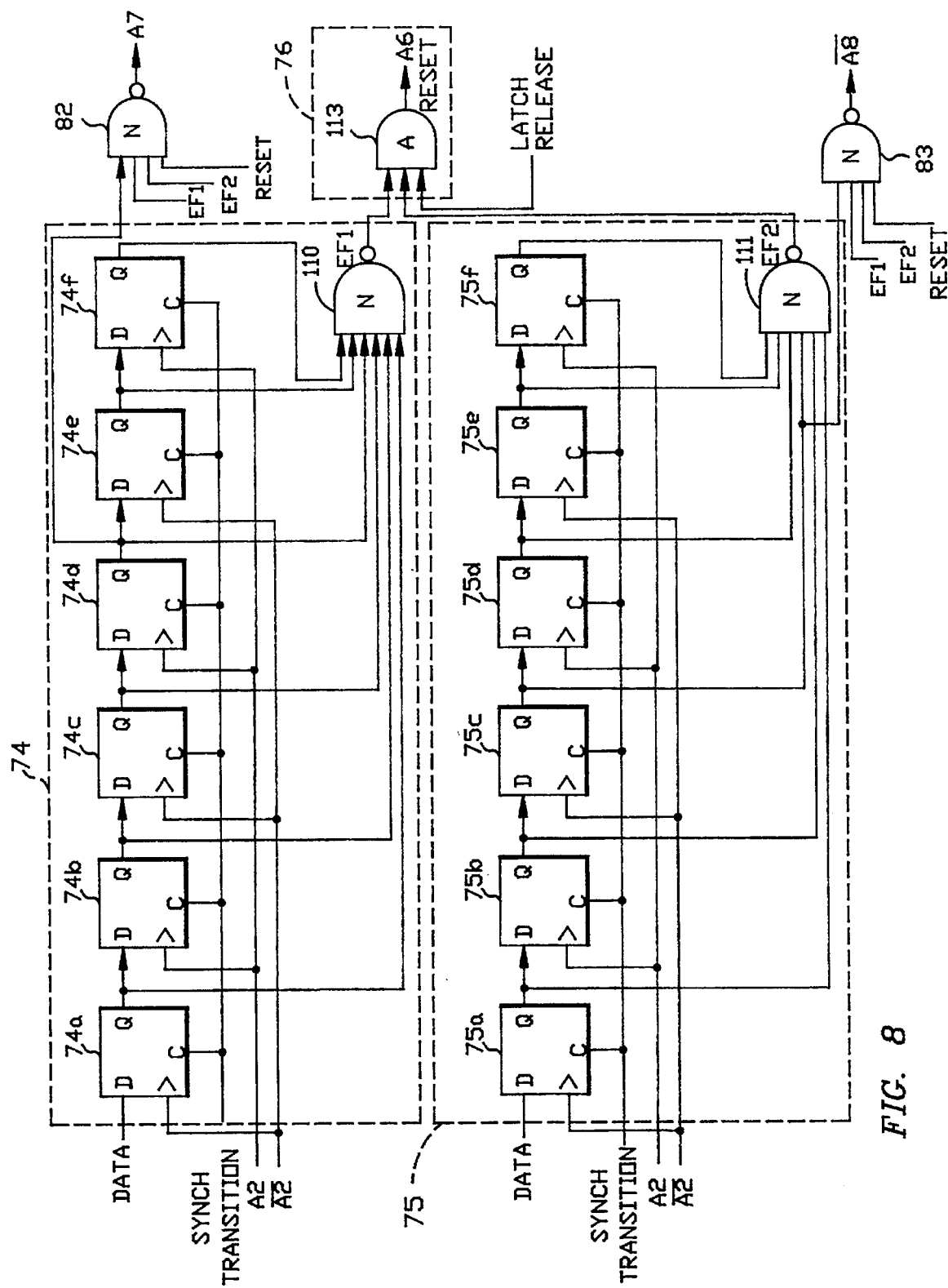
FIG. 8 is a logic diagram illustrating end-of-frame detection shift registers and the reset generator circuit of the retimer of FIG. 7.

End of frame signals EF1 and EF2 generated by the end of frame shift registers 74 and 75, respectively, are precursors to generation of the RESET signal by the circuit 76. Signals EF1, EF2, and the RESET signal are provided to a NAND gate 82 which also receives the output of the fourth flipflop of the shift register 74 which is the retimed RDATA signal. As long as the end of the current data frame has not been detected, the NAND gate 82 outputs RDATA signal which is the retimed and delayed positive-sense DATA signal input to the shift register 74. This signal is denoted as A7 in FIG. 7 and it corresponds to the waveform 12 in FIG. 5 after retiming. A retimed RDATA signal (A8) is similarly produced by a NAND gate 83 which is illustrated in FIG. 8.

The frame envelope signal, denoted as A5 in FIG. 7, is produced by a frame envelope detector 84. The frame envelope detector 84 receives the SYNCH TRANSITION signal that initiates the generation of the clocks A2 and /A2 and the RESET and the end of frame signals EF1 and EF2. These signals are used by the circuit 84 to generate the frame envelope signal which is provided to the second transceiver 52.

Sometimes phase drift between the pair of complementary binary data signals DATA and /DATA will cause a slight overlap, thereby presenting the same level for both signals to the retimer 58. Such overlap can cause the end of frame detection circuits 74 and 75 to fail to produce the EF1 and EF2 signals. When an overlap occurs, the latch up detector 86 will pulse the circuit 76 to activate the RESET signal.

Figures 9, 10:
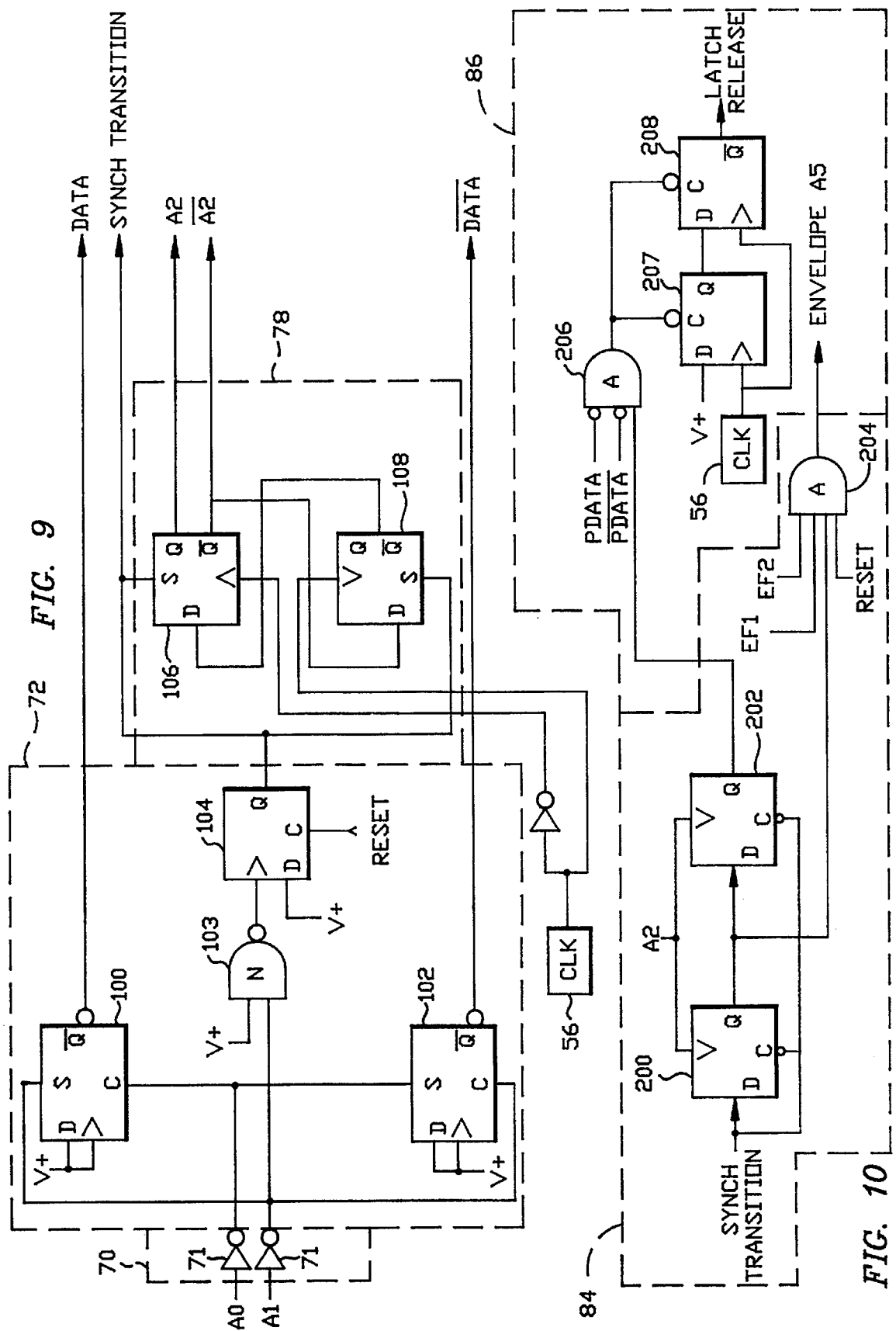
FIG. 9 is a logic diagram illustrating the data reshaping and synchronization transition detecting circuit, and the clock generation control circuit of the retimer of FIG. 7.
FIG. 10 is a logic diagram illustrating the frame envelope detector circuit and latch up detector circuit of the retimer of FIG. 7.

Refer now to FIG. 9 for further explanation of data reshaping and synch transition detection circuit 72 and clock generation and control circuit 78 which are both also shown in the retimer block diagram of FIG. 7. The signals A0 and A1 which correspond to signals 12 and 14, respectively of FIG. 5 are buffered at 70, each through a respective buffer inverter 71. The positive sense signal, A0, is fed to the CLEAR (C) port of flipflop 100 and the SET(S) port of flipflop 102. The inverted signal A1 is fed to the SET port of the flipflop 100 and to the CLEAR port of the flipflop 102. The flipflops 100 and 102 are driven by the A0 and A1 signals, without clocking to remove the timing distortion from the respective waveforms of signals A0 and A1. The flipflop 100 provides the retimed DATA signal and the flipflop 102 providing the retimed /DATA signal. A NAND gate 103 has two inputs, one tied to a positive signal level V+. The other input of the NAND gate 103 receives the inverted form of the A1 signal. Therefore, at the first negative transition of the inverted A1 signal corresponding to the negative-going transition at the mid-cell point of the synch bit in a Manchester-encoded data frame, the output of the NAND gate 103 will rise. This high transition is fed to the clock input of flipflop 104. At the end of the data frame preceding the current data frame, the RESET signal will have been activated, clearing the flipflop 104. When a positive transitioning pulse is produced by the NAND gate 103, the V+ potential of the D input of the flipflop 104 will cause the Q output of flipflop 104 to transition positively. For the remainder of the current data frame, the Q output of flipflop 104 will remain at a positive digital logic level. At the end of the frame, the RESET signal will once again reset the flipflop 104, causing the Q output to transition to a "zero" logic level, producing a SYNCH TRANSITION signal denoting the beginning of a new data frame.

In the clock generation and control circuit 78, the output of a free-running 40 MHz clock 56 is fed in inverted form to a flipflop 106 and in positive form to a flipflop 108. When the SYNCH TRANSITION signal transitions to a positive digital level at the beginning of a data frame, the flipflops 106 and 108 will conventionally divide the 40 MHz clock by half. This division will result in the provision of a 20 MHz clock output signal at the Q output of flipflop 106, denoted as A2. In parallel, the Q output of the flipflop 106 will produce a clock /A2, which is the complement of the A2 clock.

When the SYNCH TRANSITION signal transitions to a positive level, the flipflops 106 and 108 will operate in response to input clocks. The flipflop 108 is driven by the positive phase of the 40 MHz clock 56, while the flipflop 106 is driven by the complement of this clock. The phase of the clocks A2 and A2 is determined by which of the flipflops 106 or 108 first receives a positive clock transition at its input after activation of the SYNCH TRANSITION signal. Since the period of 40 MHz clock is 25 ns, a delay of no greater than one half of the 40 MHz clock period will elapse before the outputs of the flipflops 106 and 108 are active. This accounts for the nominal ±12.5 ns variation about the sampling points of the DATA and DATA waveforms.

Figure 11:
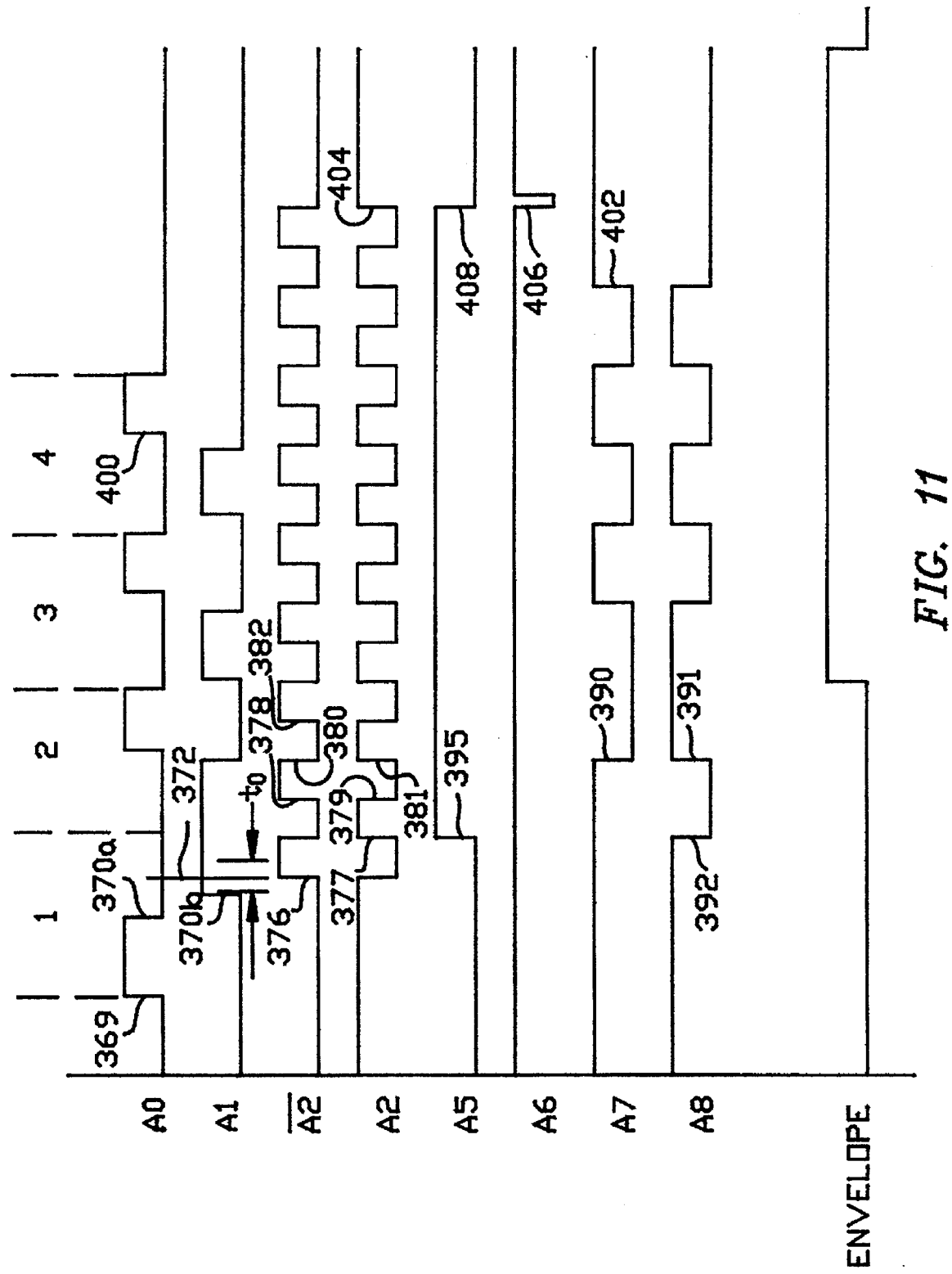
FIG. 11 is a set of waveform drawings illustrating various operations of the retimer.

Refer now to FIG. 8 for more detailed explanation of the shift registers 74 and 75. In FIG. 8 it is understood that the shift register 75 is equivalent in all structural respects to the shift register 74. However in operation, the shift register 74 shifts the DATA signal, and the shift register 75 shifts /DATA signal. In shift register 74, flipflops 74a, 74b, 74c, 74d, 74e, and 74f are connected conventionally for serially shifting the DATA waveform to the NAND gate 82. The CLEAR port of each flipflop is connected to receive the SYNCH TRANSITION signal. The flipflops 74a, 74c, and 74e are clocked by the /A2 signal, while the flipflops 74b, 74d, and 74f are clocked by the A2 signal. When the SYNCH TRANSITION signal goes positive, the flipflops 74a–f will serially shift consecutive samples of the DATA signal to the NAND gate 82. In the shift register 74, the first positive transition of the /A2 clock signal will sample the DATA waveform at approximately the three-quarter point in the synch bit (FIG. 11). Thereafter, it will alternately sample at the one-quarter and three-quarter points for each succeeding data cell. When data stops being input to the retimer, one or the other of the DATA or /DATA signals will remain high due to the final transition in a frame. As this high level propagates through one or the other of the shift registers 74 or 75, the outputs of the flipflops comprising that particular shift register 74 or 75 will all be high. Thus all of the inputs to either the NAND gate 110 or the NAND 111 will be high, causing the output of the AND gate 113 to fall. The falling signal output by one of the NAND gates 110 or 111 is denoted as an end of frame signal, with that produced by the gate 110 denoted as EF1 and that by the gate 111 as EF2. Assuming that an input signal LATCH RELEASE is high, when one or the other end of frame signals transitions to its low state, output of the AND gate 113 will fall. The output signal A6 of the AND gate 113 is the RESET signal. A falling A6 signal signifies the end of a data frame.

Referring once again to the shift register 74, it should be evident that the shift register operates in a time window spanning one and one-half data cells (or 150 ns) of the DATA waveform. This time window is sufficient to detect cessation of signaling because it will reveal the absence of a mid-bit transition in two successive data cells.

The negative transition of one of the end of frame signals, EF1 or EF2, resets the DATA and /DATA signals output by gates 82 and 83 in advance of the actual RESET signal. This is necessary in order to not extend the pulse width of the last bit any more than absolutely necessary after the data stops, before RESET occurs.

As FIG. 8 illustrates, the RDATA and /RDATA signals are derived through the NAND gates 82 and 83 from the fourth flipflops 74d and 75d of each of the registers 74 and 75, respectively, rather than the last. This reduces the throughput delay of the retimer, without affecting detection of the end of a data frame. In this regard, the last two flipflops 74d and 74e represent the 50 ns period from the mid-cell point of one cell to the beginning of the next cell.

Refer now to FIGS. 8 and 9 for an understanding of how clock generation and data reshaping are affected by the RESET signal. When a data frame ends, the flipflops 100 and 102 will have stopped transitioning and will remain in respective states determined by the last transition of the just-ended data frame. When the RESET signal transitions negatively, it clears the flipflop 104. This causes the SYNCH TRANSITION signal to fall and remain low until the negative-going transition of the synch bit in the next frame clocks the flipflop 104. When the SYNCH TRANSITION falls, the outputs of the flipflop 106 and 108 are forced high, thereby disabling the clock output A2 and A2. The negative-going transition of the SYNCH TRANSITION signal is fed to the clear ports of all of the flipflops comprising the shift register 74. This presets all of the Q outputs to zero, thereby raising the output of the NAND gate 110. In the shift register 75, the SYNCH TRANSITION is fed to the set ports of the two left-most flipflops in the shift register (these flipflops correspond in position to the flipflops 74a and 74b in shift register 74) and to the clear ports of the four right-most flipflops in the shift register. With the shift register 75 thus preset, activation of the A2 and /A2 clocks will cause the /A8 output from the NAND gate 83 to initially start from the high state and to simulate the synch pulse leading edge. Simulation of the synch pulse leading edge restores the first positive-going transition at the beginning of the data frame synch bit previously excluded by synch transition detection circuit 72.

Refer to FIG. 10 for an understanding of how the ENVELOPE signal is generated. The frame envelope detector 84 includes two flipflops 200 and 202, and a NAND gate 204. At the end of a frame, when the SYNCH TRANSITION signal is deactivated, the flipflops 200 and 202 are cleared. At the beginning of the frame, when the SYNCH TRANSITION signal is activated, the A2 clock sequences the positive state of this signal through the flipflop 200 to the NAND gate 204. The other inputs to the NAND gate 204 are the two end of frame signals (EF1 and EF2) and the RESET signal. Thus, the output of the NAND gate 204 transitions positively on the first positive-going edge of the A2 clock following the rise of the SYNCH TRANSITION signal. This inserts the same amount of delay into the positive-going transition of the ENVELOPE signal as is encountered through the shift registers 74 and 75 before the DATA and /DATA signals are available to the gates 82 and 83. When either of the EF1 or EF2 signals goes negative, the NAND gate 204 is disabled, resulting in the negative transition of the ENVELOPE signal in synchronism with the data frame.

A latch up detector circuit 86 includes an AND gate 206 and a pair of flipflops 207 and 208 clocked by the free-running CLOCK 56. As long as a PDATA signal output by the flipflop 74f, a /PDATA signal output by the flipflop 75f, and the ENVELOPE signal are not simultaneously positive, the output of the AND gate 206 is a logic low. When the output of the AND gate 206 is a logic low, the Q output of the flipflop 208 in a logic high state. However, if all three of the inputs to the AND 206 are simultaneously high, the output of the gate 206 will transition high, enabling the positive level at the input of the flipflop 207 to propagate through to the flipflop 208 at twice the data rate of the Manchester-encoded signal. This will cause the Q output of the flipflop 208 to go low, thereby disabling the output of the NAND gate 113 (FIG. 8) and activating the A6 (RESET) signal by causing it to pulse low. The free running 40 MHz clock 56 ensures that the latch up condition will be clear before the beginning of the next data frame.

The operation of the retimer 58 is described with reference to the waveforms represented in FIG. 11. In FIG. 11, a pair of complementary bilevel waveforms A0 and A1 are illustrated with reference to the A2 and /A2 waveforms generated by the clock generation and control circuits 78. In waveform A0, the positive transition 369 represents the positive-going transition of the synch bit of a Manchester waveform. The retimer 58 ignores this transition and responds, instead, to the negative-going transition of the synch bit, which is represented by the transitions 370a and 370b in the A0 and A1 waveforms. Since these transitions represent the mid-point of the synch bit, location 372 represents the three-quarter point in the synch bit where initial sampling by the shift registers 74 and 75 is to take place. Recall that the 40 MHz clock generated by clock source 56 is free-running, and that the clock generation and control circuit 78 responds to the first positive-going edge of the free-running clock signal generated by the clock 56 that occurs after the SYNCH TRANSITION signal rises. The asynchronous relationship between A0 and A1 and the free-running clock signal introduces a slight variable offset between the ideal sampling point and the first rising edge of the A2 clock. This offset is indicated by $t_0$ in FIG. 11 and can vary by ±12.5 ns about the one-quarter and three-quarter sampling points.

Once the A2 and /A2 waveforms are gated on by the clock generation and control circuit 78, it takes two complete cycles of A2 and /A2 to propagate the waveforms A0 and A1 through to the fourth flipflops 74d of the shift registers 74 and 75. Thus, at transition 372, the three-quarter point samples of the waveforms A0 and A1 are clocked into the first flipflops 74a of the shift registers 74 and 75 by the clock edge 376, into the second flipflops 74b by clock edge 377, into the third flipflops 74c by clock edge 378, and into the fourth flipflops 74d by the clock edge 381. At this time, the outputs A7 and A8 transition at 390 and 391, respectively, corresponding, to transitions 370a and 370b, respectively, in waveforms A0 and A1. Recall that the first two flipflops 74a and 74b of the shift register 75 were preset by the following edge of the SYNCH TRANSITION signal when the previous frame ended. This positive level is clocked into the third flipflop 74c of the register 75 by clock edge 376 and into the fourth register 74d by clock edge 377.

The ENVELOPE signal A5 is generated in response to the positive transition of the SYNCH TRANSITION signal after a delay of one clock period of the A2 signal through the flipflop 200 (FIG. 10). Thus, the positive-going SYNCH TRANSITION signal is clocked into flipflop 200 by rising edge 377 of the A2 signal and the ENVELOPE signal A5 is available from the frame envelope detection circuit 84 at the output. The rising edge 395 of the ENVELOPE signal is illustrated in FIG. 11 as being coincident with the rising edge 377 of the A2 clock signal.

The RESET signal (waveform A6 in FIG. 11) stays high until the end of the frame occurs, which is indicated by a period between signal transitions of the A0 or A1 waveforms exceeding 100 ns. The shift registers 74 and 75 look for the first period in excess of this period, by example, of about 100 ns, in either of the retimed data waveforms during which no signal transitions occur. In FIG. 11, such signal transition is shown to occur beginning with the transition 400 in waveform A0. Since the maximum intra-frame transition period is 100 ns, the retimer 58 looks at a period via the shift register 74 and 75, which is greater than this time. In this embodiment, the shift registers 74 and 75 each inspect a 150 ns period to generate the RESET signal when either of these registers has positive level samples for this length of time. Thus, when the positive level following the rising edge 402 in waveform A7 reaches the sixth flipflop 74f in the shift register 74, only one more positive transition of the A2 clock is required to fill the shift register with 150 ns of unvarying samples. This occurs at the rising edge 404 of the A2 clock, which results in the negative pulse 336 of the RESET signal and the falling edge 408 of the ENVELOPE waveform A5.

Obviously many modifications and variations of this invention are possible in light of these teachings, and is therefore to be understood that the invention may be practiced otherwise than as specifically described, without departing from the spirit of the claims below. For example, the synch bit signal transition pattern of the Manchester-encoded waveform may be the inverse of that described above. That is, the first transition may be a negative-going transition and the second a positive-going transition. Those reasonably skilled in the art will be able to adapt the retimer 58 as described above to respond to the second transition as taught in this invention.

We claim:

1. A system for regenerating amplitude and timing characteristics of an analog signal, comprising:

first means for transforming a first analog signal having a first waveform into a first digital signal representing a complement of said first analog signal, said first digital signal transitioning between a first logic level and a second logic level;

an electronic interface circuit through which said first digital signal is propagated;

a logic circuit which generates a second digital signal representing said analog signal in response to receiving said first digital signal and which outputs said first digital signal, said second digital signal transitioning between a third logic level and a fourth logic level;

a retimer which in response to receiving said first and second digital signals,
generates a third digital signal comprising a third series of third pulses, each one of said third pulses generated in response to said retimer determining that said first digital signal transitions from said first logic level to said second logic level; and
generates a fourth digital signal comprising a fourth series of fourth pulses, each one of said fourth pulses generated in response to said retimer determining that said second digital signal transitions from said third logic level to said fourth level; and second means for transforming said third and fourth digital signals into a second analog signal having a second waveform substantially corresponding to said first waveform.

2. The system of claim 1 wherein said electronic interface circuit is a matrix switch having an M number of input ports and an N number of output ports, where M and N are positive integers.

3. The system of claim 1 wherein said first waveform is a Manchester encoded waveform.

4. The system of claim 1 wherein said electronic interface circuit is a matrix switch having an M number of input ports and an N number of output ports for switching any one of said M input ports to any one of said N output ports, where M and N are positive integers.

5. The system of claim 4 wherein M and N are each integral multiples of two.

6. A system for regenerating amplitude and timing characteristics of an analog signal, comprising:

first means for transforming a first analog signal having a first waveform into a first digital signal representing the complement of said first analog signal;

an electronic interface circuit through which said first digital signal is propagated;

a logic circuit which generates a second digital signal representing said analog signal in response to receiving the first digital signal, and which outputs said first digital signal;

a retimer which generates a first retimed digital signal and a second retimed digital signal, corresponding to said first and second digital signals, respectively, in response to receiving said first and second digital signals; and second means for transforming the first and second retimed digital signals into a second analog signal having a waveform substantially corresponding to said first waveform.

7. The system of claim 6 wherein said electronic interface circuit is a matrix switch having an M number of input ports and an N number of output ports, where M and N are positive integers.

8. The system of claim 6 wherein said first waveform is a Manchester encoded waveform.

9. The system of claim 6 wherein said electronic interface circuit is a matrix switch having an M number of input ports and an N number of output ports for switching any one of said M input ports to any one of said N output ports, where M and N are positive integers.

10. The system of claim 9 wherein M and N are each integral multiples of two.

11. A method for regenerating amplitude and timing characteristics of an analog signal, comprising the steps of:

for transforming a first analog signal having a first waveform into a first digital signal representing the complement of said analog signal;

propagating said first digital signal through an electronic interface circuit;

generating a second digital signal representing said analog signal in response to receiving the first digital signal, and outputting said first digital signal;

transforming said first and second digital signals into a first retimed digital signal and a second retimed digital signal, where said first and second retimed digital signals correspond to said first and second digital signals, respectively; and transforming the first and second retimed digital signals into a second analog signal having a second waveform substantially corresponding to said first waveform.

* * * * *